Nov. 29, 1966   C. W. BOUCHILLON   3,288,300
CENTRIFUGAL CLEANER
Original Filed Feb. 14, 1962
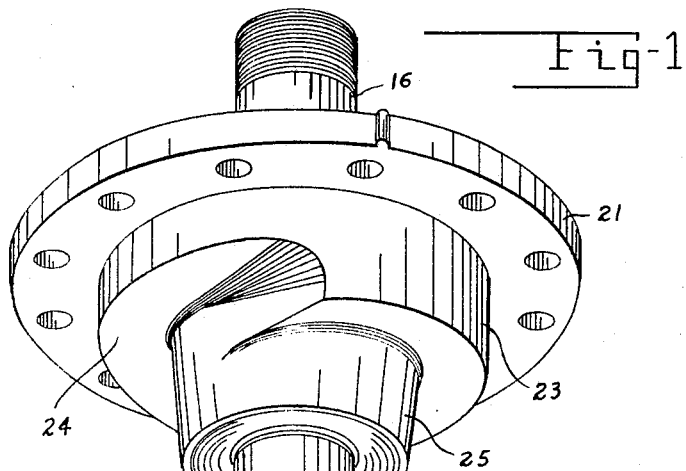
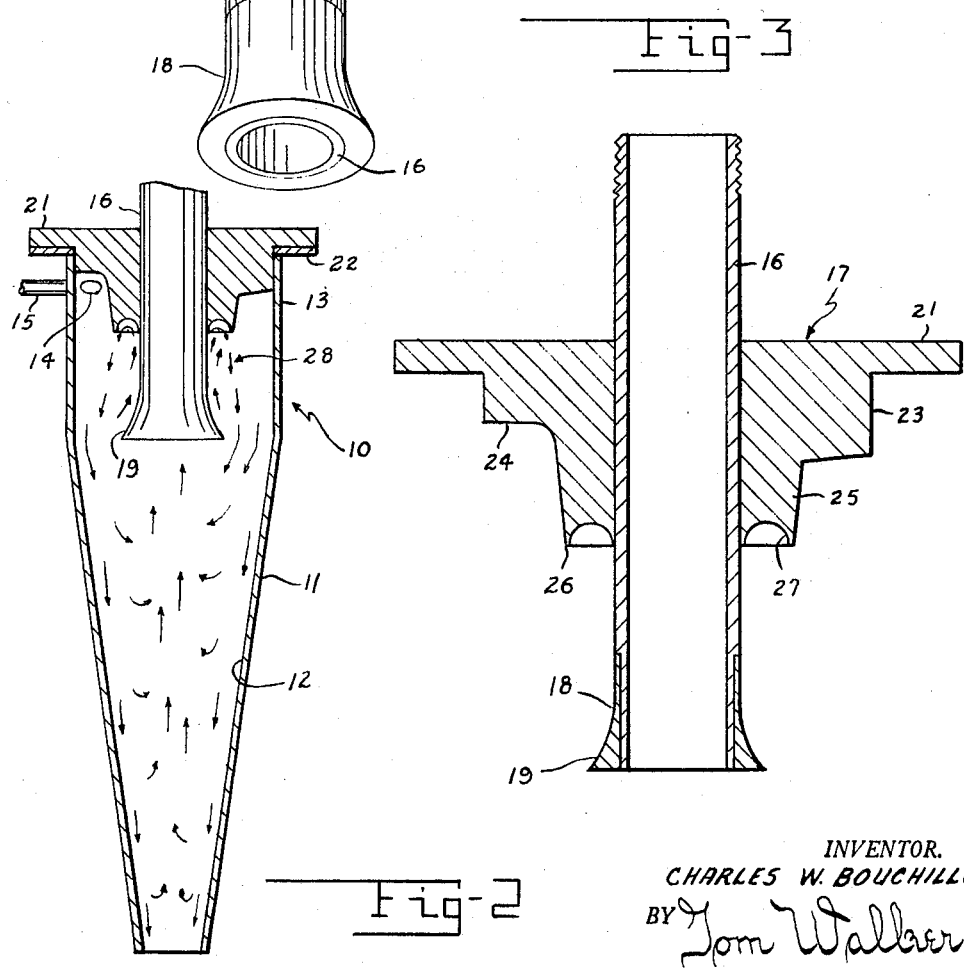
INVENTOR.
CHARLES W. BOUCHILLON
BY Tom Walker
ATTORNEY

United States Patent Office 3,288,300
Patented Nov. 29, 1966

3,288,300
CENTRIFUGAL CLEANER
Charles W. Bouchillon, Starkville, Miss., assignor to The Bauer Bros. Co., Springfield, Ohio, a corporation of Ohio
Continuation of application Ser. No. 174,074, Feb. 14, 1962. This application Aug. 12, 1965, Ser. No. 483,004
10 Claims. (Cl. 210—512)

This is a continuation of applicant's prior co-pending application Serial No. 174,074, filed February 14, 1962, now abandoned.

This invention relates to centrifugal separators, and more particularly to hydrocyclones which separate a liquid suspension of solids or slurry into accepted and rejected fractions. Although not so limited, the invention has particular reference to conical separators. These are sometimes known as cleaners, used in paper making processes to separate clean, usable fibrous material from a flowing slurry which, in addition to the usable material, contains unwanted dirt and coarse particles.

In a conventional embodiment a hydrocyclone separator as described comprises a hollow body including a short cylindrical section connected to a circular conical section truncated near its apex. An inlet at the base or cylindrical end of the separator introduces slurry tangentially of its inner wall and in a manner to cause the slurry to progress from one end of the separator to the other in a swirling motion. The apex end of the separator is open, as is the base end which mounts a nozzle or finder. The latter is located to receive and guide an inner vortex in which is comprised the accepted fraction of the slurry solids. The rejected fraction of the slurry discharges through the apex end of the separator. The nozzle arrangement at the base end is considered as providing for "overflow," with "underflow" taking place at the apex end. These terms do not denote attitude limitations since the separator can be mounted in any position convenient from an installation standpoint, the speed of movement of the slurry through the separator making the device operationally independent of gravity.

An object of the invention is to simplify the construction as well as the means and mode of operation of centrifugal cleaners whereby such cleaners may not only be economically manufactured but will be more efficient and satisfactory in use, adaptable to a wide variety of applications, and be unlikely to get out of order.

A further object of the invention is to provide apparatus affording functional improvement in the inlet or overflow region of a centrifugal separator.

Another object of the invention is to provide means exerting increased control over the admission of a fluid slurry to a separator and further control of the slurry circulation in regions of low radial flow velocity in a manner to minimize turbulence about the separator overflow nozzle with consequent improvement in the ratio of the rate of flowthrough in the separator to pressure drop.

A further and related object of the invention is to achieve given flow rates through a centrifugal separator under conditions which result in a reduction in the power required for operating a system including the separator.

Still another object of the invention is to present a generally new overflow nozzle assembly for centrifugal separators so constructed to limit short circuiting movements of a liquid slurry thereabout and to deflect the entrance to said nozzle of dirt rich slurry fractions under the influence of eddy currents.

A still further object of the invention is to provide a nozzle assembly as described which may be substituted as a unit in existing separator devices.

An additional object of the invention is to provide a centrifugal cleaner possessing the advantageous structural features, the inherent meritorious characteristics and the means and mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view, in perspective, of an overflow nozzle assembly in accordance with the illustrated embodiment of the invention;

FIG. 2 is a cross-sectional view, partly diagrammatic, of a conical hydrocyclone separator having installed therein the overflow nozzle of FIG. 1; and FIG. 3 is a view, in longitudinal section, of the nozzle assembly of FIG. 1.

Like parts are indicated by similar characters of reference throughout the several views.

Referring to FIG. 2, a hydrocyclonic separator of the kind to which this invention has special reference comprises a shell 10 suitably formed in one piece or fabricated into a unitary structure, as by being made of a plurality of sections bolted or otherwise secured together. Included in the shell 10 is a portion 11 having the shape of a truncated cone, the interior of portion 11 being hollow to define a separating chamber 12. The opposite ends of chamber 12 open through the opposing or base and apex ends of the cone. Further comprised in the shell 10 is a cylindrical base portion 13 fixed on the base end of conical portion 11 and in superposed aligned relation thereto. The outer end of cylindrical portion 13 is closed, by means hereinafter more particularly to be described, while adjacent to such outer end is an opening 14 forming a part of a laterally disposed inlet 15 offset to lie in a line tangential to a circle concentric with the longitudinal axis of the shell. The inlet 15 is adapted to be connected in a system for supplying a liquid suspension or slurry under pressure. The arrangement is one to introduce such slurry into the cylindrical portion 13 of the shell 10 tangentially to its inner wall, the continued pressured flow through the inlet causing the liquid suspension to progress in a swirling motion from the base end of the separator to its apex end, inducing, thereby, centrifugal forces. As a result of these forces there is left in the axis of the device a liquid-free core area of low pressure and an inner vortex of fluid moving contra to an outer vortex, that is in a direction from the apex end of the separator to its base end. Finder or nozzle means located in the overflow end of the separator device has one end extending inwardly of the shell to receive the inner vortex and to conduct it out of the shell. The outer end of such finder means is adapted for connection to a suitable conduit to conduct the materials caught in the inner vortex for use in a subsequent process step. In accordance with the concept and mode of operation of hydrocyclonic separators of the instant kind, air and relatively light and clean fibers from the slurry are gathered by the inner vortex and conducted out of the base end of the device as the accepted fraction while the remainder of the liquid suspension leaves the device through the apex end thereof.

The nozzle assembly of the present invention provides vortex finding means as described and closure means for the overflow end of the separator. Referring to FIGS. 1 and 2, a nozzle assembly in accordance with the illustrated embodiment of the invention comprises an open ended tube or cylinder 16 constituting the aforementioned nozzle. Secured to and radially projected from the exterior of the nozzle 16, intermediate its ends, is a body 17. The latter is adapted to serve as a closure element for the base or overflow end of the separator device and, in accordance with the invention, is constructed and arranged to serve additionally as flow control means. The lower end of the nozzle 16, as viewed in the drawing, is reduced in diameter to receive a sleeve 18 externally formed with a downwardly expanding and sloping bell-like surface 19. The sleeve 18 performs a flow control functioned as will hereinafter more clearly appear.

The body 17 is generally circular in transverse section and, to one end thereof, includes a relatively wide flange portion 21 adapted to overlie and rest upon a complementary flange 22 formed on the base or upper end of the cylindrical portion 13 of the shell 10. Bolt openings in the flanges 21 and 22 enable attachment of the body 17 to the shell. In concentric projecting relation to the body portion including the flange 21 is a reduced diameter cylindrical portion 23 received in the base end of the cylindrical shell section 13 with a substantially sliding fit. The underside of portion 23 is cut to provide a helix or helical surface 24 which in travelling once around the portion 23 achieves a longitudinal deflection equal, at least, to one diameter of inlet 14. Beyond portion 23 and surface groove 24 cut therein the body 17 terminates in a further reduced body portion 25 the periphery of which slopes gradually inward, in conical fashion, toward the axis of nozzle 16. Portion 25 in turn terminates in a transverse surface 26 so that such portion has the configuration of a truncated cone. Formed in the surface 26 is an annular depression producing a groove 27 which is semi-circular in cross section.

The arrangement of the assembly including the nozzle and body 17, accordingly, is one placing the opposite ends of the nozzle component 16 in projecting relation to the body. As seen in FIG. 2, when the body 17 is applied to bridge the base end of the separator section 13, that end of the nozzle projecting through and beyond body surface 26 forms the inner end of the nozzle while the opposite projected end becomes the outer end thereof. Further, the arrangement is one placing the nozzle 16 coaxially of the shell 10 so that the described inner vortex generated in the operation of the separator is aligned with and communicates with the inner end of the nozzle. The accepted fraction is accordingly conducted from the separator by way of the open ended nozzle and directed thereby to a place of use or storage. It is noted the exterior or outer end of the nozzle is threaded for attachment thereof to a suitable conduit.

Still further, in the installation of the nozzle assembly, such assembly is circumferentially located to position the upper or outer extremity of helical groove 24 opposite the inlet 14. As a result, in entering the separator at the inlet opening 14. A liquid suspension or slurry immediately encounters the helical surface 24 and is smoothly deflected thereby to move gradually downward out of the transverse plane of such inlet opening. Accordingly, in the swirling rotary motion of the incoming slurry, a helical control path is defined therefor which prevents the slurry from moving back into the path of further incoming material at the inlet opening. Thus, by the form of the body 17 the slurry is caused to move in a smoothly flowing stream from the inlet and into a swirling circular path which is continued through the separator. As a consequence, given or predetermined flow rates through the separator may be readily achieved and maintained under conditions of reduced pressure drop and there is correspondingly less power consumption required in a system utilizing the invention improvements.

As it leaves the helical surface 24, the slurry encounters the body portion 25 having the form of a truncated cone. This tends to establish and to maintain the rotary swirling motion of the fluids as well as aiding in the transition of the fluids from entrance to separator body conditions.

As the fluid flow develops within the separator, the semi-circular groove 27 provides a means of deflecting longitudinally directed flow components which occur in the moving slurry. By this means there is an avoidance and substantial elimination of the incidence of turbulence in the entrance region of the separator. Considering this aspect of the operation in greater particularity, as indicated by the flow directional arrows in FIG. 2, portions of the flowing slurry tend to follow a bypassing or short-circuiting path as they pass beneath the transverse plane of the inner nozzle extremity. The sleeve 18 counters or minimizes the effect of this tendency in that it throws or deflects outward current components moving inward adjacent the nozzle. This action is effective in reducing to a minimum the bypassing of such eddy currents into the open inner end of the nozzle with a consequent contamination, by a dirt-rich fraction, of the clean accepted material rising into the nozzle by way of the center vortex. However, about and adjacent the inner end of the nozzle there continues to be generated a region of low radial velocity wherein the fluid tends to turn back upon itself and move in a path shown by arrows 28 back into the entrance area of the separator. This flow is intercepted by the surface 26 of body 17 or, more particularly, by groove 27 therein. Impact on the curved surface of this groove causes the fluid flow to reverse itself, as indicated, and smoothly redirects the fluid to move downward into the separator proper in a path outward or radially offset from its central axis.

As shown, the helically cut portion 23 of body 17 may be considered a roof for the overflow end of the separator, which roof is formed to induce a smooth downward deflection of incoming liquid suspension. Truncated cone section 25 assists, as noted, in the transition movement of the liquid from entrance to separator conditions of flow. Surface 26 and groove 27 therein constitutes an auxiliary roof for the flow region of low radial velocity, in respect to longitudinal circulation components as defined at the inner end of the nozzle, and is effective in conjunction with the bell shaped sleeve 18 to limit and control short circuiting flow in this region.

The nozzle assembly of the illustrated embodiment of the invention is a two part device in which body 17 is made unitary with and fastened to the separate nozzle part 16 by welding or like process. Also, bell shaped part 18 is made separately and suitably secured as by welding or by means of a press fit to the nozzle extremity. The complete assembly might, of course, be made in a single piece or the elements thereof made separable in arrangements different from that here shown.

The nozzle assembly of the instant invention introduces a new factor in the pattern of forces at work in a centrifugal separator. The result thereof, as has been determined by observation and experimentation, is to significantly limit or to eliminate insuction through the underflow end of the separator. Insuction of either air or water frequently is undesirable so that vacuum systems applied to the apex or underflow end of the separator are in common use. The instant invention accordingly serves a further useful purpose in obviating the need for vacuum systems. The apex end of the separator may be immersed in water and the rejected fraction fed into such water without danger of drawing the dirt laden water into the separator and out the base end thereof along with the accepted slurry fraction. It is thus a part of the instant inventive concept to provide for use of a liquid separator in combination with a liquid bath, running the separator with the underflow end or tip thereof submerged within such bath.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A hydrocyclonic separator including a hollow body formed with overflow and underflow ends, an opening at each end and with a lateral tangential inlet for admitting a slurry at the overflow end, said inlet occupying a transverse plane in said body, an overflow nozzle coaxially disposed in said body to have an inner end project, in a longitudinal sense, into said body through said opening in said overflow end to and beyond the transverse plane of said inlet but terminating substantially short of the underflow end of said body, closure means filling the opening about said nozzle at the overflow end of said body, said closure means being characterized by a helical surface portion projecting inwardly of said body and about said nozzle intermediate the inner extremity thereof and the transverse plane of said inlet and a further surface portion of said closure means forming a continuation of said helical surface and terminating in a roof surface for longitudinally circulating currents of low radial velocity which tend to move about the inner extremity of said nozzle, said roof surface having the form of an annular depression which is arcuate in cross-section and operative to smoothly reverse the flow of said longitudinally circulating currents which impact thereon.

2. A hydrocyclonic separator including a hollow shell formed with overflow and underflow ends having at the overflow end means defining a tangentially disposed laterally directed inlet for entrance of a liquid suspension, and a coaxially disposed overflow nozzle received in said shell at said overflow end, said nozzle being in spaced relation to the wall of said shell and extending downwardly below said inlet means, characterized by an improvement consisting of a body element mounted to the upper end of said nozzle within said shell, said body element including a first downwardly depending cylindrical portion concentric with said nozzle, the outer wall of said first portion being received in said overflow end of said shell in abutting relation to the wall of said shell, said first portion having formed in its lower end a peripheral helix so constructed and arranged so as to receive and guide the incoming liquid suspension from said inlet downwardly toward said underflow end, said body element also including a frusto-conical portion extending downwardly from said first portion, said frusto-conical portion being concentric with said nozzle and having an outer wall spaced from the wall of said shell, the lower end of said frusto-conical portion having formed therein an annular depression which is arcuate in cross section, the lower end of said nozzle projecting downwardly below said first and frusto-conical portions of said body element and having means on its lower end defining a downwardly diverging member.

3. A hydrocyclonic separator providing a hollow body formed with overflow and underflow ends and with a lateral tangential inlet for admitting a slurry at the overflow end, and providing, further, an overflow nozzle longitudinally disposed in said body and having an inner end projecting inwardly of said body at said overflow end to and beyond the transverse plane of said inlet but terminating substantially short of the underflow end of said body, characterized by means on said nozzle defining a transverse surface generally at right angles to the axis of said nozzle and laterally spaced from the wall of said hollow body, the inner end of said nozzle being in inwardly projecting relation to said transverse surface, said transverse surface having an arcuately curved depression in an annular area thereof, said arcuately curved depression being effective, on impact thereon, to reverse flow currents moving along said inner end of said nozzle toward the overflow end of said body so as to redirect them back towards the underflow end of said body, the annular area of said surface, at its inner diameter, being closely adjacent the external surface of said nozzle to produce a smoothly guided reverse current motion.

4. A hydrocyclonic separator including a hollow shell formed with base and apex ends and an opening, in each end, there being disposed near the base end an inlet for the tangential introduction of a liquid suspension to said shell; a nozzle body mounted to the base end of said shell including a closure portion received in said opening at said base end, said closure portion having on the underside thereof a helical groove, an open ended tube providing a nozzle defining a central opening in said closure portion, said nozzle body further including a reduced diameter portion concentric with and projecting from the underside of the closure portion and sloping on its exterior toward the central axis of said nozzle body, said reduced diameter portion terminating in a surface generally transverse to the axis of said open ended tube; one end of said tube projecting through and beyond the plane of said generally transverse surface and said body and tube being united in an integral structure so as to enable its unitary installation in and removal from said shell.

5. A hydrocyclonic separator according to claim 4, characterized by means on the nozzle body adapted to overlie and engage against the base end of said shell to position said body relative to said shell, said closure portion of said body engaging said shell to limit relative lateral motion of said body, a liquid suspension entering said shell through said inlet encountering the helical groove and being directed thereby to move in a smooth circular fashion towards the apex end of said shell, said reduced diameter portion of said body being spaced from said shell and being positioned to be smoothly encountered by the flowing liquid suspension as it leaves said helical groove.

6. A hydrocyclonic separator according to claim 4, characterized in that said nozzle body is rotatively positioned in said shell to align the entrance end of said helical groove with said inlet, the exit end thereof discharging on said reduced diameter portion of said body.

7. A hydrocyclonic separator as in claim 4, characterized in that said generally transverse surface has a form to reverse flow currents moving along the inner end of said open ended tube towards the base end of the shell so that such currents are redirected in a smooth recirculating fashion back toward the apex end of said shell.

8. A hydrocyclonic separator providing a hollow shell formed with base and apex ends and an opening at each end, there being disposed near the base end an inlet for the tangential introduction of a liquid suspension, a body mounted to said shell serving to substantially close said base end, said body including a central opening and containing in said central opening an open ended tube, said body including a portion received in said shell in a manner to limit its lateral relative motion, said body further including a reduced diameter portion projecting from the underside of its first mentioned portion and terminating in a surface generally transverse to the axis of said tube, said tube being coaxial with said shell and one end thereof projecting through and beyond the plane of said generally transverse surface, said one end of said tube mounting a bell formation beyond said transverse surface on said reduced diameter portion of said body, said bell formation and said generally transverse surface on said body defining substantially opposed deflecting means at opposite ends of a region of low radial velocity within said shell, said generally transverse surface having a form to smoothly reverse the flow of currents reaching said surface.

9. A hydrocyclonic separator including a hollow shell formed with overflow and underflow ends having at the overflow end means defining a tangentially disposed laterally directed inlet for entrance of a liquid suspension, and a coaxially disposed overflow nozzle received in said shell at said overflow end, said nozzle being in spaced relation to the wall of said shell and extending past the said inlet means, characterized by an improvement consisting of a body element mounted to said nozzle within said shell, said body element including a first cylindrical portion concentric with said nozzle, the outer wall of said first portion being in abutting relation to the wall of said shell, said first portion having formed in its inner end a peripheral helix so constructed and arranged so as to receive and guide the incoming liquid suspension from said inlet toward said underflow end, said body element also including a frusto-conical portion extending inwardly from said first portion, said frusto-conical portion being concentric with said nozzle and having an outer wall spaced from the wall of said shell, the innermost surface of said frusto-conical portion having formed therein an annular depression which is arcuate in cross section, the inner end of said nozzle projecting beyond the said first and frusto-conical portions of said body element and having means on its projected end defining a downwardly diverging member.

10. A hydrocyclonic separator including a hollow shell formed with overflow and underflow ends having at the overflow end means defining a tangentially disposed laterally directed inlet for entrance of a liquid suspension, and a coaxially disposed overflow nozzle received in said shell at said overflow end, said nozzle being in spaced relation to the wall of said shell and extending past said inlet means, characterized by an improvement consisting of a body element mounted to said nozzle within said shell, said body element including a cylindrical portion received in said overflow end of said shell in abutting relation to the wall thereof, said portion having formed in its inner end a peripheral helix so constructed and arranged so as to receive and guide the incoming liquid suspension from said inlet toward said underflow end, said body element being rotatively positioned to locate the upper end of said helix opposite said inlet means, the incoming liquid suspension immediately encountering said helix and being smoothly deflected thereby to move gradually downward out of the transverse plane of said inlet means and a frusto-conical portion extending inwardly from the first said portion, said frusto-conical portion being concentric with said nozzle and having an outer wall spaced from the wall of said shell, the lower end of said helix converging upon and merging smoothly with the surface of said frusto-conical portion, the inner end of said nozzle projecting beyond the first said portion and said frusto-conical portion of said body element.

References Cited by the Examiner
UNITED STATES PATENTS

| | | | |
|---|---|---|---|
| 2,783,070 | 3/1956 | Cottrell | 210—512 |
| 2,799,208 | 7/1957 | Scott | 55—454 X |
| 3,007,542 | 11/1961 | Giampapa et al. | 55—191 X |
| 3,101,313 | 8/1963 | Woodruff | 210—512 X |
| 3,105,044 | 9/1963 | Troland | 210—512 |

REUBEN FRIEDMAN, *Primary Examiner.*

J. DE CESARE, *Assistant Examiner.*